Oct. 9, 1951     E. F. SHAWVER     2,570,602
CALIBRATED TRAVELING BAND RADIO INDICATOR OR DIAL
Filed April 10, 1946
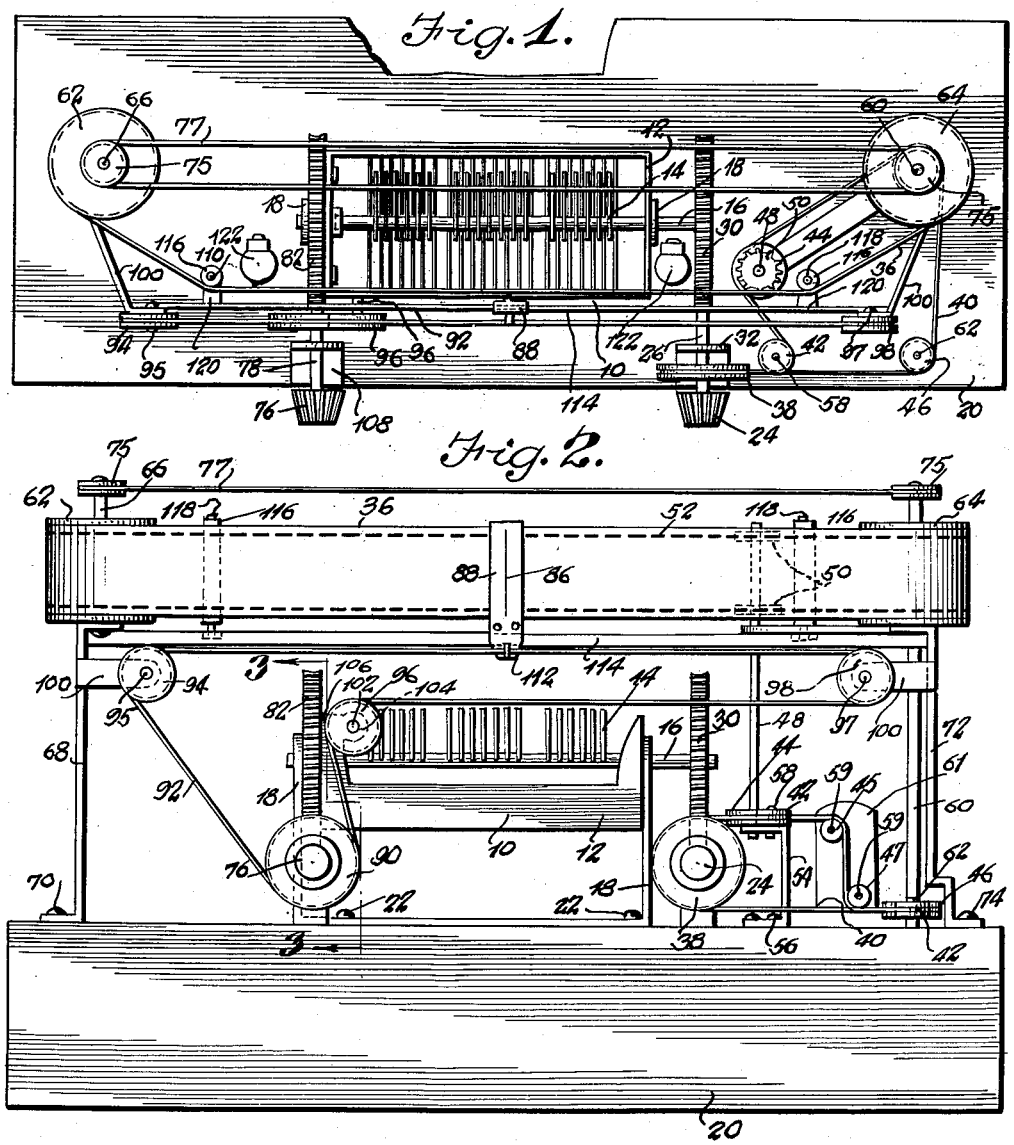
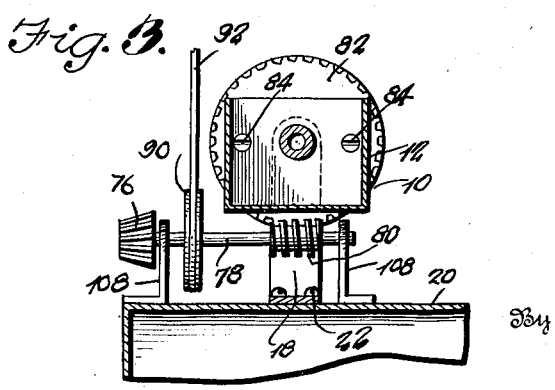
Inventor
*Ernest F. Shawver*
By *Victor J. Evans & Co*
Attorneys Patented Oct. 9, 1951

2,570,602

UNITED STATES PATENT OFFICE 2,570,602

CALIBRATED TRAVELING BAND RADIO INDICATOR OR DIAL

Ernest F. Shawver, Houston, Tex.

Application April 10, 1946, Serial No. 660,893

2 Claims. (Cl. 116—124)

This invention relates to a calibrated travelling band radio indicator or dial and the principal object of the invention is to provide a device which will band-spread any portion of the range of adjustment of a variable element in an electrical circuit, such as a variable resistance, variable inductance or variable capacitance.

In this particular phase of the invention the device is applied to a variable condenser as used in a radio receiver, and such specific application will serve to illustrate its advantages, its usefulness and its operation.

The invention consists of the novel details of construction and arrangement and combination of parts more fully hereinafter described, claimed and illustrated in the accompanying drawing in which:

Figure 1 is a top plan view of an embodiment of the invention;

Figure 2 is a front view thereof and

Figure 3 is a sectional view on the line 3—3 of Figure 2.

Referring more in detail to the drawing the reference numeral 10 indicates a condenser having a condenser electrode section 12 and a condenser electrode section 14 fixed to the shaft 16 which pivotally mounts the condenser 10 by means of the brackets 18 secured to the base 20 by fasteners 22.

The movement of the section 14 is controlled by the knob 24 fixed on one end of the shaft 26, having a worm, not shown, thereon meshing with the gear 30 on the shaft 16. The shaft 26 being mounted in brackets 32 fixed to the base 20 by any well known fastening means. Movement of the section 14 is reflected through movement of the strip scale 36, which may be of any convenient length. The movement of scale 36 is also controlled by knob 24 through a pulley 38 fixed to the shaft 26 a cable 40 trained over idler pulleys 42 and pulleys 44, 45, 46 and 47 and the shaft 48 of pulley 44 has spaced parallel sprockets 50 on the upper end thereof engaging openings 52 adjacent the opposite edges of the scale 36. The shaft 48 being mounted on the bracket 54 secured to the base by fasteners 56 as in the shaft 58 of one of the idler pulleys 42. The shaft 62 of pulley 46 as well as the shaft 60 being journalled in the base 20, and the shafts 59 of pulleys 45 and 47 are journalled in the bracket 61 secured to the base 20.

The scale 36 is stored on specially constructed drums 62 and 64, which have spiral take-up springs mounted therein to store the scale as adjustments are made. The shaft 66 of drum 62 being journalled in the bracket 68 fixed to the base by fasteners 70 and the drum 64 mounted on the shaft 66. The shaft 60 is also journalled in the bracket 72 secured to the base by fasteners 74 and the scale is supported in an elevated position above the condenser 10 by the drums as shown in the drawing and pulleys 75 fixed on the upper ends of shafts 60 and 66 has the cable 77 trained thereover.

The section 12 is movable under the control of the knob 76 fixed on one end of the shaft 78 having a worm 80 thereon meshing with a gear 82 on the shaft 78 and the gear is connected to the stator 12 by fasteners 84 Figure 3 and the worm 80 is similar to the worm on shaft 26 that meshes with the gear 30 on the shaft 16. Movement of the stator is reflected by movement of the indicator line 86 on the indicator 88 which is also controlled by knob 76 through a pulley 90 fixed to the shaft 78 and a cable 92 trained over pulleys 94, 96 and 98 the shafts 95 and 97 of the pulleys 94 and 98 being journalled in arms 100 formed on brackets 68 and 72 and the shaft 102 of pulley 96 on an arm 104 of the bracket 106 and the shaft 78 is journalled in brackets 108, secured to the base by any well known fastening means: A slide 112 fixed to the cable 92 supports the indicator 88 which engages the rail 114 connected to the arms 100 and the scale 36 is brought into contact with the indicator 88 by rollers 116, the shafts 118 of which are journalled in brackets 120 formed on the rail 114 and light bulbs 122 are provided for illuminating the scale 36.

The pitch and size of the worms and gears, the size of the various pulleys and drums and the sprockets are so proportioned and the length of the scale so chosen that the linear movement of the scale per degree of rotation of the section 14 is exactly equal to the linear movement of the indicator and indicator line per degree of rotation of the section 12. Therefore reading of the instrument is an enlarged and always true indication of the relation and therefore the adjustment of the section 14 to the section 12 regardless of their position.

Knob 24 becomes a full range adjusting or band setting control. Knob 76 becomes a band spread control over whatever portion of the scale is brought into view.

Band spreading as employed in the average communication receiver, or all-wave receiver is for a predetermined narrow band, accomplished by specially padded coils for the particular band or by means of auxiliary condensers connected in parallel with the main tuning condenser. Where parallel condensers are used the main tuning condenser must be set at a particular setting in order to make band-spread calibration correct. Possibility of resetting to exactly the same adjustment is difficult to obtain. This device eliminates the auxiliary condensers. It also eliminates the possibility of error in resetting to exactly the same adjustment. This device makes possible band-spreading on any portion of the range of adjustment without auxiliary condensers or specially padded coils, only bare essentials of the circuit are required in connection with this adjusting device. Calibration is always correct for no preadjustment of any part of the apparatus is required. Calibration can be marked directly upon the enlarged scale and therefore can be easily read.

Since the adjustment of a variable condenser depends solely upon the relation of the stator section to the rotor section and this relation can be reflected by the relation of the scale 36 and the indicator line 86, it is possible through this device to have continuous band spread calibration through the range of adjustment. When a plain circular dial is used to adjust a variable condenser the stator section of the condenser and the dial marker are fixed and the dial and rotor section are moved about the rotor axis for adjustment. Now, if the stator section and dial marker are allowed to move about the same axis as the dial and rotor section through a limited range and this movement is made to move slowly then minute adjustment could be obtained and in the calibration would always be correct regardless of the position of the dial or marker with respect to the panel or any other part of the apparatus since the reading always reflects the relation of the rotor to the stator. Such a calibrated device would be difficult to read accurately. If the full range movement of the rotor section could be reflected by a large movement of a film scaling across a viewing window the calibration could be more accurately read. Now, if the indicator marker line could be made movable across this viewing window and its linear movement across the window per degree of rotation of the stator section about the axis made exactly equal to the linear movement of the film scale per degree of rotation of the rotor section about the axis then the reading of the scale is always a true reflection of the relation of the rotor section to the stator section regardless of their positions within the viewing window and therefore always a true reading of the adjustment of the apparatus. Minute adjustment with an accurately readable scale could be had by making the indicator hair line move slowly across the viewing window. Thus band spreading whatever portion of the scale that is brought into view.

All of the above is accomplished with this device and it is believed the operation thereof will be apparent to those skilled in the art.

It is also to be understood that changes in the combination and arrangement of parts as well as details of construction may be resorted to providing they fall within the spirit of the invention and the scope of the appended claims.

Having thus described the invention what is claimed as new and desired to be secured by Letters Patent is:

1. In a device of the character described for band-spreading any portion of the range of adjustment of a variable element in an electrical circuit having two or more interleaved movable sections provided with means for the rotation thereof, and the means for rotating one of said sections adapted to move said one section a greater distance than the means for rotating the other section the improvement comprising a strip scale member adapted to be moved linearly, means engaging said strip scale member for moving said member in unison with the one of said sections that is moved the greater distance, and an indicator for said scale adapted to be moved linearly with relation to said strip scale member and means for moving said indicator in unison with the other of said sections but for a lesser distance than that travelled by said strip scale member.

2. Indicating means for a variable element in an electrical circuit having two or more interleaved movable sections provided with means for rotating one of said sections a greater distance than the other of said sections, comprising a strip scale having means on the end thereof for alternately winding or unwinding said scale during the operation thereof, and said scale adapted for simultaneous movement with the one of said sections moving the greater distance, an indicator adapted for coaction with said scale and adapted for simultaneous movement with the other of said sections, cable means connected to said indicator, a pulley on the means for moving said latter section engaging said cable for simultaneous movement of said indicator with said last mentioned means, and cable means connected to the means for alternately winding or unwinding said scale and said latter means being connected to the means for moving said first section whereby both said indicator and said scale may be operated in relative relation to each other.

ERNEST F. SHAWVER.

REFERENCES CITED

The following references are of record in the file of this patent:

UNITED STATES PATENTS

| Number | Name | Date |
|---|---|---|
| 1,353,145 | Clement | Sept. 21, 1920 |
| 1,695,390 | Sanford | Dec. 18, 1928 |
| 1,713,001 | Nehrke | May 14, 1929 |
| 1,941,090 | Hoffman et al. | Dec. 26, 1933 |
| 1,977,289 | Scofield | Oct. 16, 1934 |